(12) United States Patent
Kim et al.

(10) Patent No.: US 12,474,741 B2
(45) Date of Patent: Nov. 18, 2025

(54) DISPLAY DEVICE

(71) Applicant: LG Display Co., Ltd., Seoul (KR)

(72) Inventors: Wontae Kim, Paju-si (KR); Sehwan Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 205 days.

(21) Appl. No.: 18/224,890

(22) Filed: Jul. 21, 2023

(65) Prior Publication Data

US 2024/0036611 A1 Feb. 1, 2024

(30) Foreign Application Priority Data

Jul. 26, 2022 (KR) .................. 10-2022-0092374

(51) Int. Cl.
| | |
|---|---|
| *G06F 1/16* | (2006.01) |
| *B60K 35/60* | (2024.01) |
| *G02F 1/13* | (2006.01) |
| *G02F 1/1368* | (2006.01) |
| *H04M 1/02* | (2006.01) |
| *H10K 59/80* | (2023.01) |

(52) U.S. Cl.
CPC ............ *G06F 1/1656* (2013.01); *B60K 35/60* (2024.01); *G02F 1/1323* (2013.01); *G02F 1/1368* (2013.01); *G06F 1/1616* (2013.01); *G06F 1/1652* (2013.01); *H04M 1/0216* (2013.01); *H04M 1/0268* (2013.01); *H10K 59/872* (2023.02); *H10K 59/8794* (2023.02)

(58) Field of Classification Search
CPC .... G06F 1/1601; G06F 1/1609; G06F 1/1626; G06F 1/1633; G06F 1/1637; G06F 1/1656; B60K 35/22; B60K 35/23; B60K 35/81
See application file for complete search history.

(56) References Cited

U.S. PATENT DOCUMENTS

| | | | | |
|---|---|---|---|---|
| 2010/0165219 | A1* | 7/2010 | Ikunami | ................ G06F 1/1656 348/836 |
| 2015/0282364 | A1* | 10/2015 | Moon | ..................... H04M 1/18 174/50.51 |
| 2016/0320810 | A1* | 11/2016 | Kim | ...................... G06F 1/1677 |
| 2020/0209973 | A1 | 7/2020 | Kim et al. | |

FOREIGN PATENT DOCUMENTS

| | | |
|---|---|---|
| DE | 10 2020 127 024 A1 | 4/2021 |
| EP | 3 822 107 A1 | 5/2021 |
| KR | 10-2020-0073083 A | 6/2020 |
| WO | WO 2012/082980 A1 | 5/2012 |

* cited by examiner

*Primary Examiner* — Anthony Q Edwards
(74) *Attorney, Agent, or Firm* — Birch, Stewart, Kolasch & Birch, LLP

(57) ABSTRACT

A display device is provided which is capable of improving the waterproof function and design. The display device can include a housing and a cover member which surround a display panel and which are bent and coupled, and a groove formed in the housing and capable of storing moisture and foreign substances.

15 Claims, 9 Drawing Sheets

DISPLAY DEVICE

CROSS-REFERENCE TO RELATED APPLICATION

The present application claims priority to Korean Patent Application No. 10-2022-0092374, filed Jul. 26, 2022 in the Republic of Korea, the entire contents of which are hereby expressly incorporated by reference into the present application.

BACKGROUND OF THE DISCLOSURE

Field

The present disclosure relates to a display device and more particularly to a coupling structure of a cover member disposed on a display panel and a housing disposed below the display panel, and a structure for blocking moisture or foreign substances from flowing into a coupling area between the cover member and the housing.

Discussion of the Related Art

Various types and shapes of display devices that display an image in a TV, a monitor, a smartphone, a laptop, a vehicle dashboard, and a navigation system, etc., are being used.

Among the various types of display devices, a liquid crystal display (LCD) device is used, while the use and application range of an organic light emitting display (OLED) device is rapidly increasing.

The display device includes a display panel in which an image is displayed. Generally, if the display panel forms an image by using liquid crystal, the display panel is classified as the LCD device, whereas if the display panel forms an image by using an organic light emitting device, the display panel is classified as the OLED device.

The display device can be used in various places. For example, the display device can be used by being disposed on a seat of an aircraft, on a dashboard of a vehicle, or in front of a passenger seat of a vehicle. Since the image formed by the display device spreads widely toward the surrounding area, the image can be reflected by objects placed around the area.

In the case of the display device installed in a vehicle, the image is reflected by the window, etc., disposed around the display device, so that a driver's field of view or a user's field of view can be blocked or the driver's view or the user's view can be dispersed. As such, a risk of an accident issue may be present. Accordingly, the display device can include a viewing angle control unit which widens the user's field of view and limits the viewing angle in order to prevent an accident due to the view dispersion, or to reduce the risk of accidents issues.

Further, a display device for a vehicle or a display device which is used being exposed to the external environment, such as a smart phone or a tablet PC, can be exposed to various environments on a daily basis.

The display panel for displaying an image can include a plurality of light emitting devices or liquid crystals and a driving circuit portion for individually controlling the operation of each light emitting device or liquid crystal. However, the light emitting device or driving circuit portion can be vulnerable to moisture and oxygen.

In a state where the display device is exposed to various environments, an impact protection structure and a waterproof and dustproof structure can be provided to the display device in order to obtain a stable operating performance.

For example, in order to prevent or minimize the display device from being damaged by external environment and prevent/minimize foreign substances (moisture) from flowing into the display device, a cover member can be disposed above the display panel, and a housing can be disposed below the display panel.

When a cover member, etc., is included in a display device in order to protect a display panel, the size of the display device can increase, and thus, an installation space for the display device can be limited.

Further, parts can be added to couple or fix components for protecting the display panel, such as the cover member, etc., and manufacturing costs and processes can increase due to the addition of the parts.

Further, moisture and foreign substances can flow into the display device through a coupling area of the components for protecting the display panel, and thus, the display panel can be damaged.

SUMMARY OF THE DISCLOSURE

One of the objects of the present disclosure is to provide a display device having a smaller size and an improved design.

Further, another object of the present disclosure is to provide a display device having a simplified manufacturing process thereof and a reduced component cost.

Further, another object of the present disclosure is to provide a structure for blocking moisture and foreign substances from flowing into the display device.

Another object of the present disclosure is to provide a display device which can address the limitations and disadvantages associated with the related art.

The technical problems and issues to be overcome by the present disclosure are not limited to the above-mentioned technical issues. Other technical limitations not mentioned can be clearly understood from those described below by a person having ordinary skill in the art.

Accordingly, one embodiment of the present disclosure provides a display device including: a display panel that displays images, a cover member disposed on the display panel, and a housing disposed below the display panel.

In one or more embodiments of the present disclosure, the cover member can include a first flat portion, a first bent portion bent from the first flat portion, and a first groove formed in the first bent portion.

In one or more embodiments of the present disclosure, the housing can include a second flat portion, and a second bent portion which is bent from the second flat portion and has a protrusion coupled to the first groove.

Other details of the embodiments of the present disclosure are included in the detailed description and drawings.

According to one or more embodiments of the present disclosure, the cover member disposed on the display panel includes the first bent portion, so that the area of the end of the display device can be formed in a rounded shape, and thus, the size of the display device can be reduced and the exterior design of the display device can be improved.

The cover member according to one or more embodiments of the present disclosure includes the first groove, and the housing includes the protrusion coupled to the first groove, so that the cover member and the housing can be coupled without additional parts. Accordingly, the component cost can be reduced and the process can be simplified.

According to one or more embodiments of the present disclosure, since the second groove is disposed in the second bent portion of the housing and a gap is formed in the coupling area between the cover member and the housing, moisture introduced through the coupling area between the cover member and the housing can be stored and can be removed by evaporating the moisture with the lapse of a certain time. Accordingly, the waterproof function can be improved.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
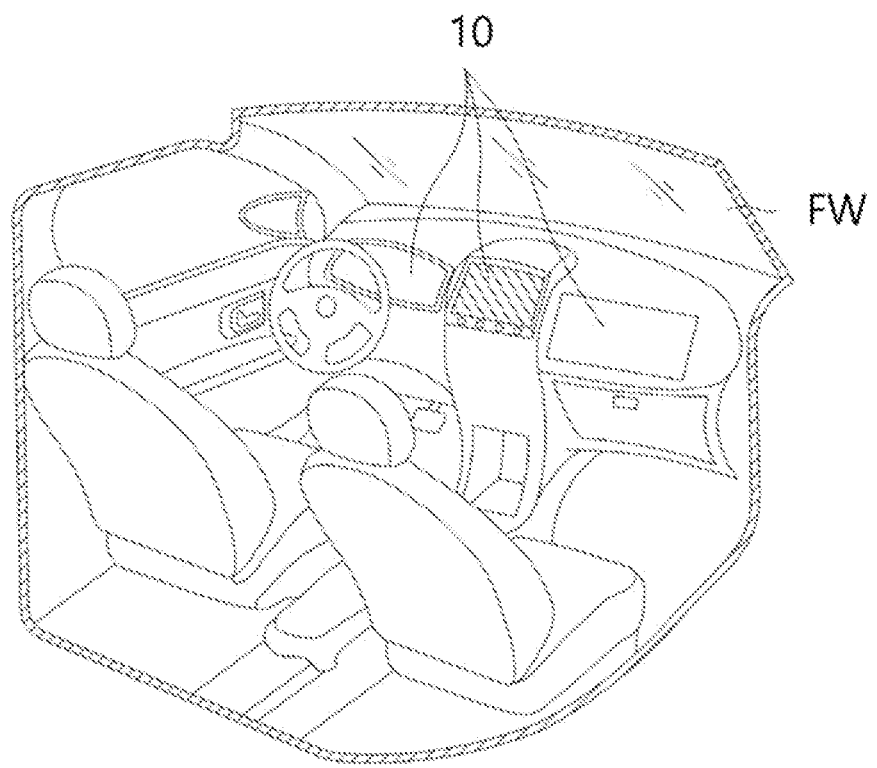
FIG. 1 shows an area to which a display device according to an embodiment of the present disclosure is applied.

Specific details for embodying the present disclosure will be more apparent from referring to the following embodiments described as well as the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The claims are not limited to the embodiments of the present disclosure.

Since the shapes, sizes, proportions, angles, numbers, etc., disclosed in the drawings for describing the embodiments of the present disclosure are illustrative, the present disclosure is not limited to the shown details. The same reference numerals throughout the disclosure correspond to the same elements. Further, throughout the description of the present disclosure, the detailed description of known technologies incorporated herein will be or can be omitted when it can make the subject matter of the present disclosure unclear. Terms such as "includes", "has", "composed", etc., mentioned in the present disclosure are used, other parts can be added unless a term "only" is used. A component represented in a singular form includes the expression of plural form thereof unless otherwise explicitly mentioned.

In construing components, error ranges are construed as being included even unless otherwise explicitly mentioned.

In describing positional relationships, when the positional relationship of two parts is described, for example, "on", "over", "under", "next to", etc., one or more other parts can be positioned between the two parts as long as a term "directly" or "immediately" is not used.

What an element or layer is referred to as being "on" another an element or layer includes both a case where an element or layer is just on another element or layer and a case where a further another element or layer is interposed between them.

While terms such as the first and the second, etc., can be used to describe various components, the components are not limited by the terms mentioned above. The terms are used only for distinguishing between one component and other components. Therefore, the first component to be described below can be the second component within the spirit of the present disclosure.

The same reference numerals throughout the disclosure correspond to the same elements. However, different features can be obtained according to embodiments.

The size and thickness of each component shown in the drawings can be provided for convenience of description, and the present disclosure is not necessarily limited to the size and thickness.

The features of the various embodiments of the present disclosure can be partially or entirely coupled to or combined with each other, and as those skilled in the art can fully understand, the features can be technically and variously connected and driven. Further, the embodiments can be implemented independently of each other or together in an association relationship.

A display device according to an embodiment of the present disclosure can be applied to a liquid crystal display device and an organic light emitting display device, but is not limited thereto, and can be applied to various display devices such as an LED display device or a quantum dot display device.

Hereinafter, the display device according to various embodiments of the present disclosure will be described with reference to the drawings. All the components of the display device according to all embodiments of the present disclosure are operatively coupled and configured.

FIG. 1 shows an area to which the display device according to the embodiment of the present disclosure is applied.

Referring to FIG. 1, a display device 10 according to the embodiment of the present disclosure can be applied to a dashboard and a navigation system disposed in front of a driver's seat DS of a vehicle or can be applied to a personal image display device that can display information in front of a passenger seat PS. The display device 10 can be formed in the form in which a plurality of display devices is installed separately. Alternatively, the plurality of display devices is connected as a whole to form one display device 10.

The display device 10 includes a display panel for displaying an image, and the display panel displays a desired image by emitting light, and the emitted light can be incident on a front window FW of the vehicle.

The light incident on the front window FW of the vehicle is reflected and can be viewed and recognized by a passenger of the vehicle, and a portion of the front window FW of the vehicle is covered, so that the field of view of the passenger is narrowed, and a passenger's view can be dispersed.

Therefore, in order to widen the field of view of the passenger and to prevent a risk of an accident due to the view dispersion during the driving of the vehicle, a viewing angle control unit can be included in the display device 10.

In addition, for the purpose of protecting the display device 10 from external impact that can occur when the display device 10 is exposed to the external environment and of preventing moisture and foreign substances from entering the display device 10, the display device 10 can include a cover member and a housing which surround the display panel.

When the cover member and the housing are included in the display device 10 and a part for coupling the cover member and the housing is added to the display device 10, a bezel, that is a border portion of the display device 10 where no image is output, can become larger.

Therefore, it is necessary to reduce the bezel of the display device 10 by changing the shapes of the cover member and the housing which surround the display panel or by changing a method for coupling the cover member and the housing.

In addition, in order to prevent the display panel from being damaged by moisture and foreign substances flowing into the display device, it is necessary to block the introduction of moisture and foreign substances into the display device.

Figure 2A:
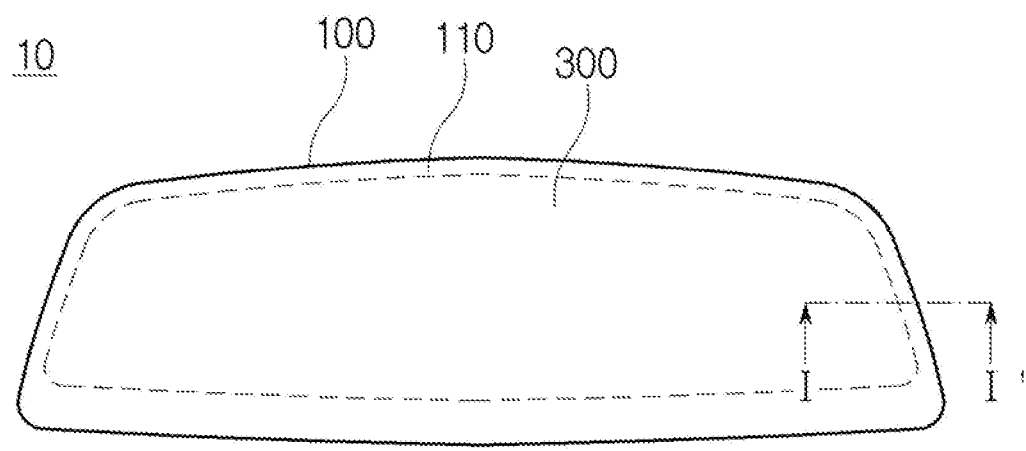
FIG. 2A is a plan view showing a plane of the display device according an the embodiment of the present disclosure.
Figure 2A:
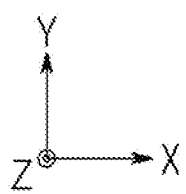
Figure 2B:
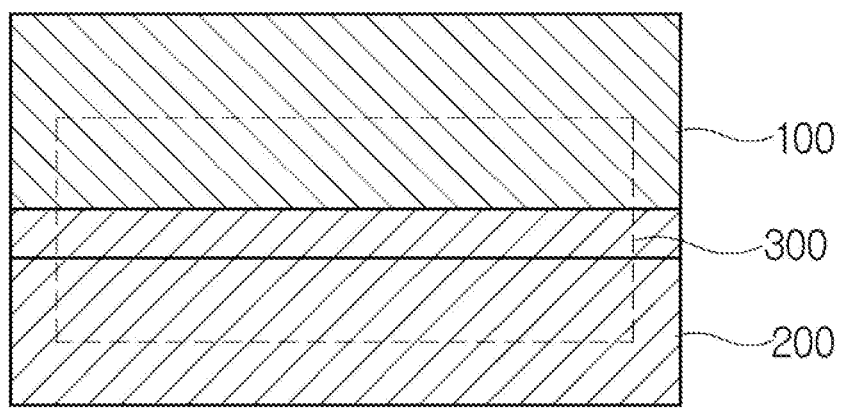
FIG. 2B is a side view showing a side of the display device according to the embodiment of the present disclosure.
Figure 2B:
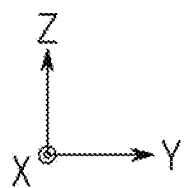

FIG. 2A is a plan view showing a plane of a display device according to an embodiment of the present disclosure, and FIG. 2B is a side view showing a side of the display device of FIG. 2A. The display device of FIGS. 2A and 2B and other figures can be applied in the vehicle environment of FIG. 1.

Referring to FIGS. 2A and 2B, a display device 10 according to this embodiment includes a cover member 100 and a housing 200, and a display panel 300 that display an image is disposed within the cover member 100 and the housing 200. The cover member 100 and the housing 200 surround the display panel 300 to protect the display panel 300 from external impact and to block moisture and foreign substances that can flow into the display panel 300 from the outside.

A light-shielding member 110 can be disposed in an edge region of an end of the cover member 100.

Since the light-shielding member 110 is disposed on the rear surface of the cover member 100 and overlaps a coupling area between the cover member 100 and the housing 200 from a plane point of view, the coupling area between the cover member 100 and the housing 200 can be blocked from being viewed by a user.

The light-shielding member 110 can be disposed to correspond to at least a non-display area of the display panel 300 and the display device 10. The light-shielding member 110 can be made of a material capable of absorbing light. For example, the light-shielding member 110 can also be formed of a black matrix and can be formed by printing black ink, but is not limited thereto.

Ends of the cover member 100 and the housing 200 of the display device 10 can be bent and coupled to each other. The end of the cover member 100 is bent downward (in a −Z-axis direction), and the end of the housing 200 is bent upward (in a Z-axis direction), so that the end of the cover member 100 and the end of the housing 200 are can be coupled.

Accordingly, the cover member 100 and the housing 200 can be coupled in a central region in a thickness direction (e.g., Z-axis) of the display device 10.

The cover member 100 can be made of a transparent material so as to overlap an area where an image is displayed. For example, the cover member 100 can be made of a cover glass made of a transparent plastic material or a transparent glass material, which allows an image to transmit therethrough, but is not limited thereto.

The housing 200 can be made of both transparent and opaque materials, and can include one selected from the group consisting of plastic and glass. The housing 200 can be made of materials such as aluminum (Al), electric galvanized steel sheet (EGI), stainless (SUS), galvalume (SGLC), tin plated steel plate (SPTE), etc., in order to function as a heat dissipation path, but is not limited thereto.

The cover member 100 and the housing 200 surround the display panel 300, and thus, protects the display panel 300.

Figure 3:
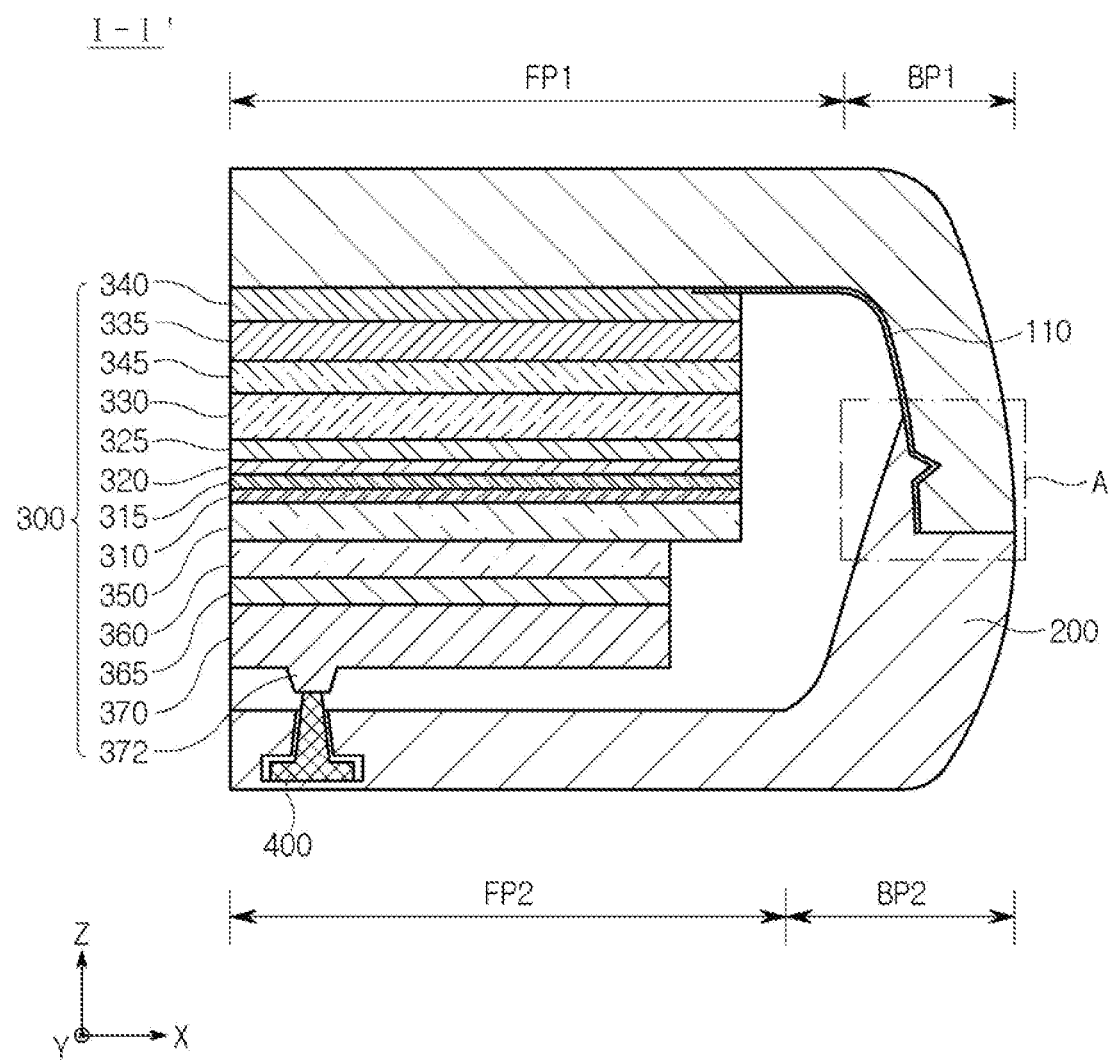
FIG. 3 is a cross-sectional view taken along line I-I' of FIG. 2A.

FIG. 3 is a cross-sectional view taken along line I-I' of FIG. 2A.

Referring to FIG. 3, the display panel 300 is disposed between the cover member 100 and the housing 200. The display panel 300 can include a display substrate 310, a thin film transistor array 315, a light emitting layer 320, an encapsulation part 325, an optical plate 330, and a viewing angle control unit 335. The display panel 300 including the viewing angle control unit 335 can be fixed to the cover member 100 by a first adhesive layer 340. For example, the display panel 300 can include the first adhesive layer 340 on the viewing angle control unit 335, and the display panel 300 can be fixed to the cover member 100 through the first adhesive layer 340.

Since the image of the display panel 300 must be transmitted through the first adhesive layer 340 while attaching the display panel 300 to the cover member 100, the first adhesive layer 340 can be made of materials such as an optical clear adhesive (OCA), optical clear resin (OCR), or pressure sensitive adhesive (PSA), which has high adhesion and transmittance, or can include the materials. The material of the first adhesive layer 340 is not limited thereto.

The display substrate 310 can be made of plastic or glass, etc. In the case of using a substrate made of plastic, the substrate is thin and flexible. Therefore, the substrate made of plastic is widely used in a flexible display device that can be bent and folded. In the case of a substrate made of glass, the substrate has a flat surface and has a certain level of strength and hardness. Therefore, it is easy to form a driving thin film transistor and a light emitting device on the substrate made of glass.

A small organic light emitting display device is generally used in a smart phone, and the substrate made of plastic can be used in order that the small organic light emitting display device can be applied to a flexible smart phone and a foldable smart phone. The substrate made of plastic can be made of polymer or polyimide (PI) and can be configured by stacking a plurality of layers in order to increase strength.

In addition, since a medium or large organic light emitting display device has a larger area than the small organic light emitting display device, the number of driving circuits and the number of pixels increase and the substrate made of glass, which is capable of continuously maintaining flatness, can be used. The material of the display substrate 310 is not limited thereto, and various materials can be used.

The thin film transistor array 315 can be disposed on the display substrate 310. The thin film transistor array 315 can include a plurality of sub-pixels for displaying an image and a driving circuit portion for driving the plurality of sub-pixels. The driving circuit portion can include a thin film transistor layer including a gate electrode, an active layer, a source electrode, and a drain electrode.

In the organic light emitting display device, the light emitting layer 320 can be disposed on the thin film transistor array 315. Each of the plurality of sub-pixels includes the light emitting layer 320, and the light emitting layer 320 can include a first electrode, a light emitting device, and a second electrode. The light emitting layer 320 can be disposed to correspond to a display area of the substrate. The light emitting layer 320 can emit light by a high-potential data voltage supplied to the first electrode and a low-potential common voltage supplied to the second electrode through the thin film transistor array 315. Light generated from the light emitting device is emitted to a front surface, so that a desired image can be formed.

A liquid crystal display device can include the thin film transistor array 315, a first electrode, a liquid crystal layer, and a second electrode. The liquid crystal layer can be driven by a data voltage supplied to the second electrode and a common voltage supplied to the first electrode through the thin film transistor array 315. Backlight disposed below the display panel 300 is blocked by the liquid crystal layer or passes through the liquid crystal layer, so that a desired image can be formed.

The encapsulation part 325 can be disposed on the light emitting layer 320. The encapsulation part 325 can be disposed to protect the thin film transistor array 315 and the light emitting layer 320 from external impact and to prevent oxygen or moisture from penetrating into the thin film transistor array 315 and the light emitting layer 320. The encapsulation part 325 can include at least one inorganic layer and at least one organic layer, but is not limited thereto.

The optical plate 330 can be additionally disposed on the encapsulation part 325. The optical plate 330 can have a form in which one or more functional layers are stacked, but is not limited thereto.

For example, the optical plate 330 can include a reflection preventing layer such as a polarizing film which is capable of improving an outdoor visibility and contrast ratio of an image displayed on the display panel 300 by preventing reflection of external light. Alternatively, the optical plate 330 can further include a barrier layer for preventing penetration of moisture or oxygen. The barrier layer can be made of a material having low moisture permeability such as a polymer material.

The viewing angle control unit 335 can be disposed on the optical plate 330. The viewing angle control unit 335 can be positioned between the cover member 100 and the optical plate 330. The viewing angle control unit 335 can be fixed on the optical plate 330 by a second adhesive layer 345.

The end of the cover member 100 can contact and be coupled to the end of the housing 200. The entire area of the end of the cover member 100 can contact and be coupled to the entire area of the end of the housing 200. When the end of the cover member 100 and the end of the housing 200 contact and are coupled, it is possible to primarily prevent external moisture or foreign substances from being introduced into the display device 10.

The end of the cover member 100 can be seated on and connected to a level difference formed at the end of the housing 200, and the cover member 100 and the housing 200 can be connected by various coupling means.

Figure 4:
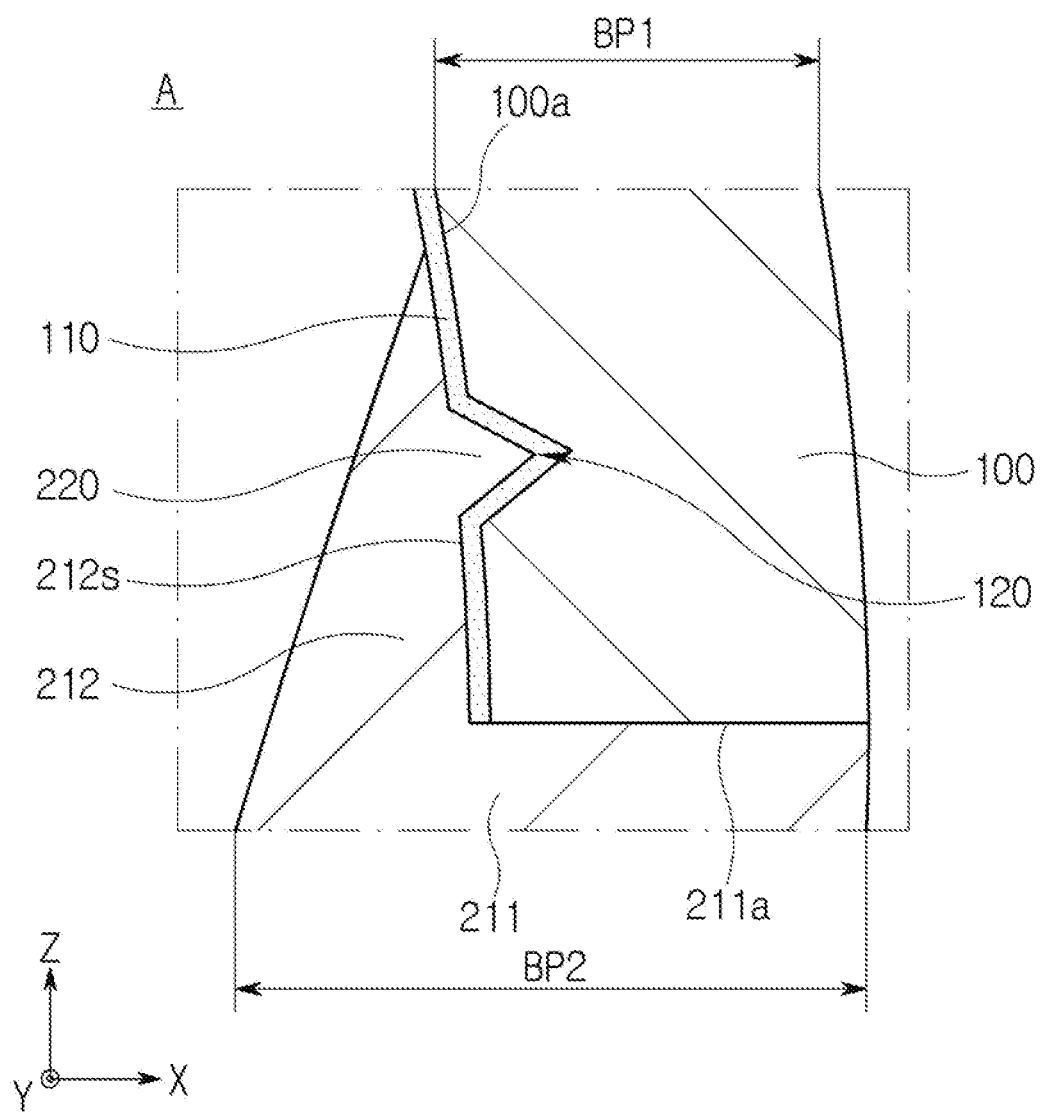
FIG. 4 is an enlarged view of a region "A" of FIG. 3, which shows the embodiment of the present disclosure.

FIG. 4 is an enlarged view of a region "A" of FIG. 3 according to an embodiment of the present disclosure.

Referring to FIG. 4, a first bent portion BP1 of the cover member 100 can include a first groove 120. The first groove 120 can be formed in various shapes such as a triangle, a quadrangle, and a hemispherical shape.

The first groove 120 can be formed in the form of a groove by removing a certain area of the cover member 100 by means of a groove forming device such as a laser beam, a grinder, a water jet, and a drilling machine. The groove forming device for forming the first groove 120 is not limited thereto, and the first groove 120 can be formed by using various devices.

The first groove 120 can be formed in the first bent portion BP1, and the first groove 120 can be formed in an area of an end of the first bent portion BP1. The area of the end of the first bent portion BP1 can refer to an area around an inner surface of the end of the first bent portion BP1.

For example, the cover member 100 can be disposed on the display panel 300 and can include a first flat portion FP1, the first bent portion BP1 bent from the first flat portion FP1, and the first groove 120 formed in the first bent portion BP1. The first groove 120 can be formed in an inner surface 100a of the cover member 100.

Further, the housing 200 can be disposed below the display panel 300 and can include a second flat portion FP2 and a second bent portion BP2 that is bent from the second flat portion FP2 and has a protrusion 220 that is coupled to the first groove 120.

The second bent portion BP2 can include a first part 211 which extends from the second flat portion FP2, a second part 212 which extends from a first surface 211a of the first part 211, and the protrusion 220 which protrudes from an outer surface 212s of the second part 212 toward the inner surface 100a of the cover member 100.

For example, the protrusion 220 which is coupled to the first groove 120 can be included in the level difference located at an end of the second bent portion BP2 of the housing 200. The protrusion 220 can be formed at an end of the stepped level difference or in an area of the end of the level difference. The area of the end of the level difference can be an area around an outer surface of the level difference.

The protrusion 220 can be formed in various shapes such as a quadrangle, a hemispherical shape, etc., in correspondence to the shape of the first groove 120.

The protrusion 220 of the second bent portion BP2 of the housing 200 is coupled to the first groove 120 of the first bent portion BP1 of the cover member 100, so that the cover member 100 and the housing 200 can be fixed to each other.

An end surface of the cover member 100 and the first surface 211a, for example, an end surface of the housing 200, can contact and be coupled. For example, the first bent portion BP1 of the cover member 100 can come into contact with the first surface 211a of the first part 211 of the housing 200. Therefore, since there is no gap in the portion where the end surface of the cover member 100 is connected to the first surface 211a of the housing 200, it is possible to prevent moisture or foreign substances from being introduced into the connection portion between the cover member 100 and the housing 200.

The light-shielding member 110 is disposed in a partial area of the first bent portion BP1, so that the coupling area between the first groove 120 and the protrusion 220 can be blocked from being viewed by the user.

The light-shielding member 110 is also disposed in the first groove 120 of the first bent portion BP1, so that it is possible to improve the rigidity of the first bent portion BP1 and to prevent damage that can occur when the first groove 120 and the protrusion 220 are coupled.

Figure 5:
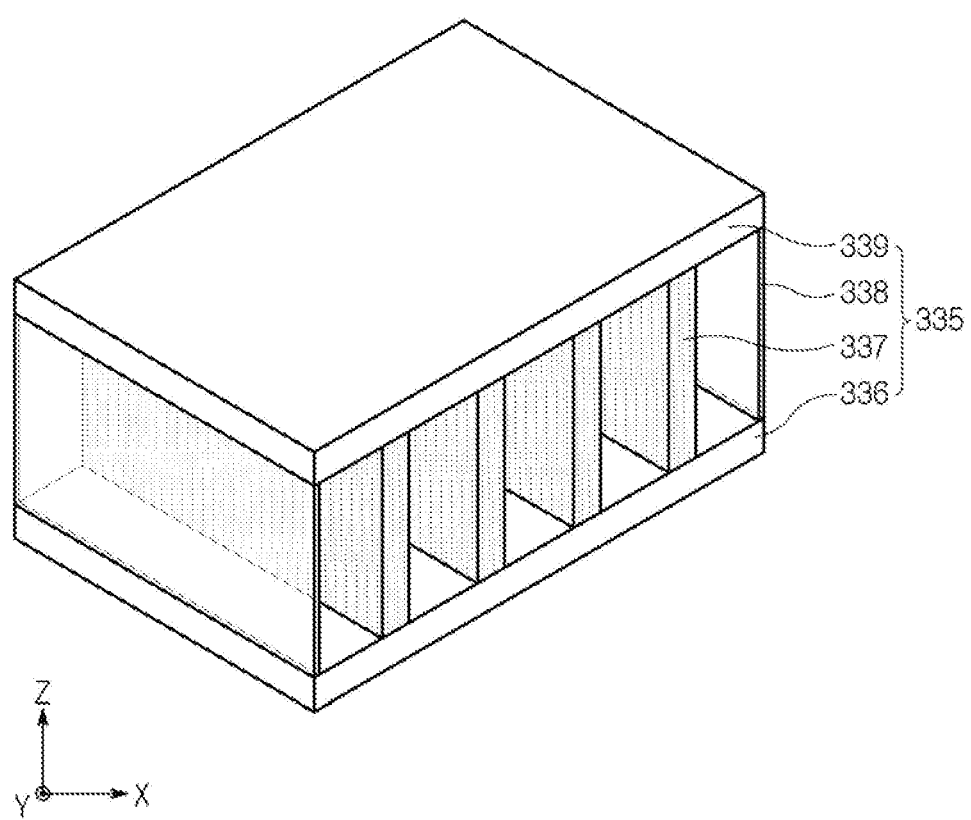
FIG. 5 shows a viewing angle control unit of the display device according to the embodiment of the present disclosure.

FIG. 5 shows the viewing angle control unit of the display device according to the embodiment of the present disclosure.

Referring to FIG. 5, the viewing angle control unit 335 can include light-shielding patterns 337 positioned between a lower control board 336 and an upper control board 339.

The light-shielding patterns 337 can include a material capable of shielding light. For example, the light-shielding patterns 337 can include a black dye such as carbon black.

The viewing angle control unit 335 can limit a viewing angle in the Y-axis direction. For example, the light shielding patterns 337 can extend side by side in the X-axis direction and can limit light that heads in the up and down direction, for example, in the Y-axis direction. Here, the Y-axis direction can be an up and down direction based on the user's field of view.

When the display device 10 according to the embodiment of the present disclosure is installed in a dashboard and a navigation system of the vehicle and in front of a passenger seat of the vehicle or is integrally installed as a whole, the image is not directed to the front window FW, so that it is possible to prevent the image reflected from the front window FW from being viewed. Therefore, the field of view is not blocked by the viewing angle control unit 335, and an accident due to the view dispersion can be effectively prevented.

The viewing angle control unit 335 can include a control insulating layer 338 that surrounds the light-shielding patterns 337. The control insulating layer 338 can include an insulating material. The control insulating layer 338 can include a transparent material. For example, light emitted through the top surface of the light emitting layer 320 can pass through the control insulating layer 338 positioned between the light-shielding patterns 337. A space between the lower control board 336 and the upper control board 339 can be completely filled by the light-shielding patterns 337 and the control insulating layer 338. Accordingly, damage and deformation of the light-shielding patterns 337 that can be caused by external impact applied to the display device 10 can be prevented.

Meanwhile, various components for rigidity and heat radiation of the display panel 300 can be disposed below the display substrate 310.

Referring to FIG. 3, a support member 350, a heat dissipation plate 360, and a guide holder 370 can be disposed below the display substrate 310. The support member 350 can be disposed below the display substrate 310 to strengthen the rigidity of the display substrate 310. The support member 350 can be formed to have a certain strength and thickness in order to strengthen the rigidity of the display substrate 310.

The support member 350 can be made of plastic materials such as polyethylene terephthalate (PET), polycarbonate (PC), polyimide (PI), etc., but is not limited thereto.

The heat dissipation plate 360 or a cushion plate can be disposed below the support member 350.

The cushion plate can be formed by stacking a plurality of layers having various functions such as a heat dissipation layer having a heat dissipation function, a lift prevention layer for preventing the lifting of the heat dissipation layer, a cushion layer capable of absorbing impact, and an adhesive layer that couples the heat dissipation layer and the cushion layer.

The heat dissipation plate 360 can be disposed to correspond to a component that generates a high temperature and can be disposed to correspond to the display substrate 310.

The heat dissipation plate 360 can include a material having a high thermal conductivity, and can dissipate heat generated from a driver connected to the display panel 300 or the thin film transistor array 315.

For example, the heat dissipation plate 360 can include a metal having a high thermal conductivity such as copper (Cu) and aluminum (Al) or can include graphite, etc., but is not limited thereto. In addition, since the heat dissipation plate 360 has conductivity, it can have not only a heat dissipation function but also a grounding function and a function of protecting the rear surface of the display substrate 310.

The guide holder 370 can be fixed below the heat dissipation plate 360 by a third adhesive layer 365.

The guide holder 370 can be disposed on the rear surface of the display panel 300 and can allow set instruments such as the housing 200, a printed circuit board, or the like to be coupled to the display panel 300.

The guide holder 370 can be disposed to protect the display panel 300 from external impact applied to the rear surface of the display panel 300 and to fix the display panel 300 to the cover member 100 and the housing 200.

The guide holder 370 can include an elastic material such as urethane, etc., or a material having high rigidity such as polycarbonate, etc. When the guide holder 370 is arranged to be coupled to the set instruments, the material having high rigidity such as polycarbonate, etc., can be applied. When the guide holder 370 is arranged to protect the display panel 300 from external impact, the elastic material such as urethane, etc., can be applied.

A plurality of bosses 372 is formed on the rear surface of the guide holder 370 and can be seated on the housing 200. The bosses 372 can be disposed in edge regions of the guide holder 370, respectively. Alternatively, the bosses 372 can be disposed in edge regions and central region of the guide holder 370, respectively. The position of the boss 372 is not limited to this. The position and number of the bosses can be changed according to a fixing function and an impact absorbing function of the guide holder 370.

The boss 372 can directly contact the housing 200 to fix the display panel 300 to the housing 200. When the boss 372 directly contacts the housing 200, the rear surface of the guide holder 370 does not directly contact the housing 200, so that external impact transmitted from the housing 200 to the display panel 300 can be reduced.

In addition, lifting of a portion of the guide holder 370 and a portion of the housing 200, which can occur when the rear surface of the guide holder 370 is not flat, can be improved.

In order to firmly fix the guide holder 370, the guide holder 370 can be fixed to the housing 200 by a connection member 400 such as a screw, a bolt, or a fixing pin, etc. The connection member 400 pushes up the guide holder 370 or couples the guide holder 370 to the connection member 400, so that the guide holder 370 can be firmly fixed to the housing 200.

A through-hole can be formed in the housing 200 such that the connection member 400 passes through the housing 200 and contacts the guide holder 370. The connection member 400 is inserted into the through-hole of the housing 200 to fix the display panel 300.

The connection member 400 can be disposed at a position corresponding to the plurality of bosses 372 of the guide holder 370. The connection member 400 contacts the plurality of bosses 372, thereby fixing the display panel 300 and preventing the guide holder 370 from being damaged by the connection member 400.

Meanwhile, the cover member 100 can be disposed over the viewing angle control unit 335. The display panel 300 including the viewing angle control unit 335 can be fixed below the cover member 100 by the first adhesive layer 340.

The flat portion FP1 of the cover member 100 can be disposed to correspond to the position where the display panel 300 is disposed. The display panel 300 can extend up to the first bent portion BP1, and the display panel 300 can also be bent along the inner curved surface of the first bent portion BP1.

The first bent portion BP1 is bent downward to round the edge of the display device 10 and to prevent other components other than the cover member 100 from being viewed in the front direction of the display device 10.

Accordingly, the bezel of the display device 10 can be reduced, and various designs can be applied to the edge region of the display device 10.

The housing 200 can be disposed below the display panel 300. The cover member 100 and the housing 200 can be coupled and fixed to each other, and the cover member 100 and the housing 200 can be formed to surround the display panel 300.

Figure 6:
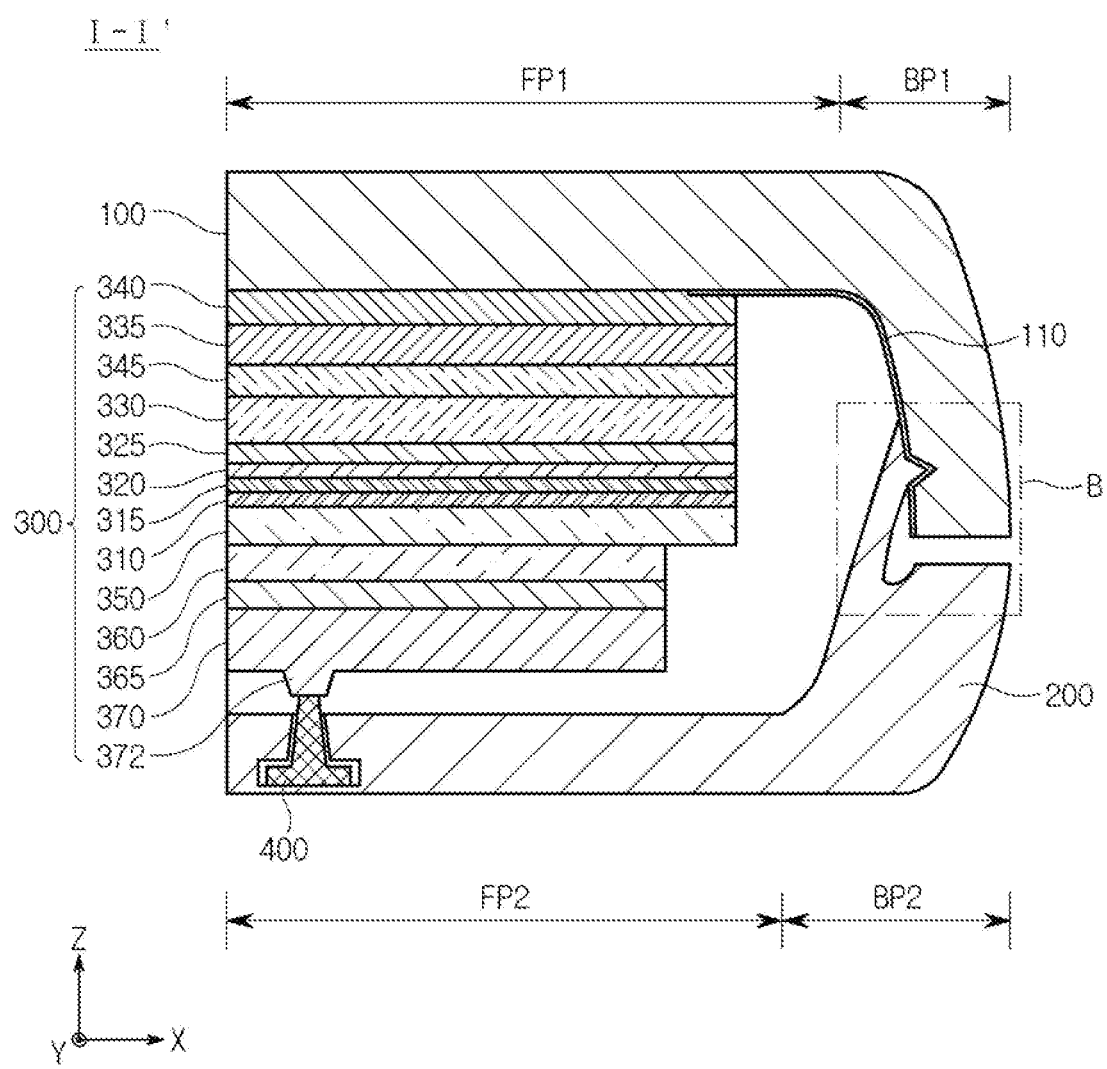
FIG. 6 is a cross-sectional view taken along line I-I' of FIG. 2A, which shows another embodiment of the present disclosure.

FIG. 6 is a cross-sectional view taken along line I-I' of FIG. 2A, which shows another embodiment of the present disclosure.

Referring to FIG. 6, the cover member 100 can be disposed on the display panel 300 and can include the first flat portion FP1 and the first bent portion BP1 bent from the first flat portion FP1.

Further, the housing 200 can be disposed below the display panel 300 and can include the second flat portion FP2 and the second bent portion BP2 bent from the second flat portion FP2.

The second bent portion BP2 of the housing 200 can include the first part and the second part that extends from a certain area of the first part. A level difference can be formed by the second part formed at an end of the second bent portion BP2 of the housing 200.

The cover member 100 can be connected to and fixed to the level difference of the housing 200, and the cover member 100 and the housing 200 can be connected by various coupling means.

In a coupling structure between the cover member 100 and the housing 200, a gap can be formed between the first bent portion BP1 of the cover member 100 and a first surface, for example, an end surface of the second bent portion BP2 of the housing 200. Thus, the cover member 100 can be connected or coupled to the second part of the housing 200.

Since a gap is formed between the first bent portion BP1 of the cover member 100 and the first surface of the housing 200, moisture introduced into the coupling structure between the cover member 100 and the housing 200 can be easily evaporated, and foreign substances can be easily removed.

Figure 7:
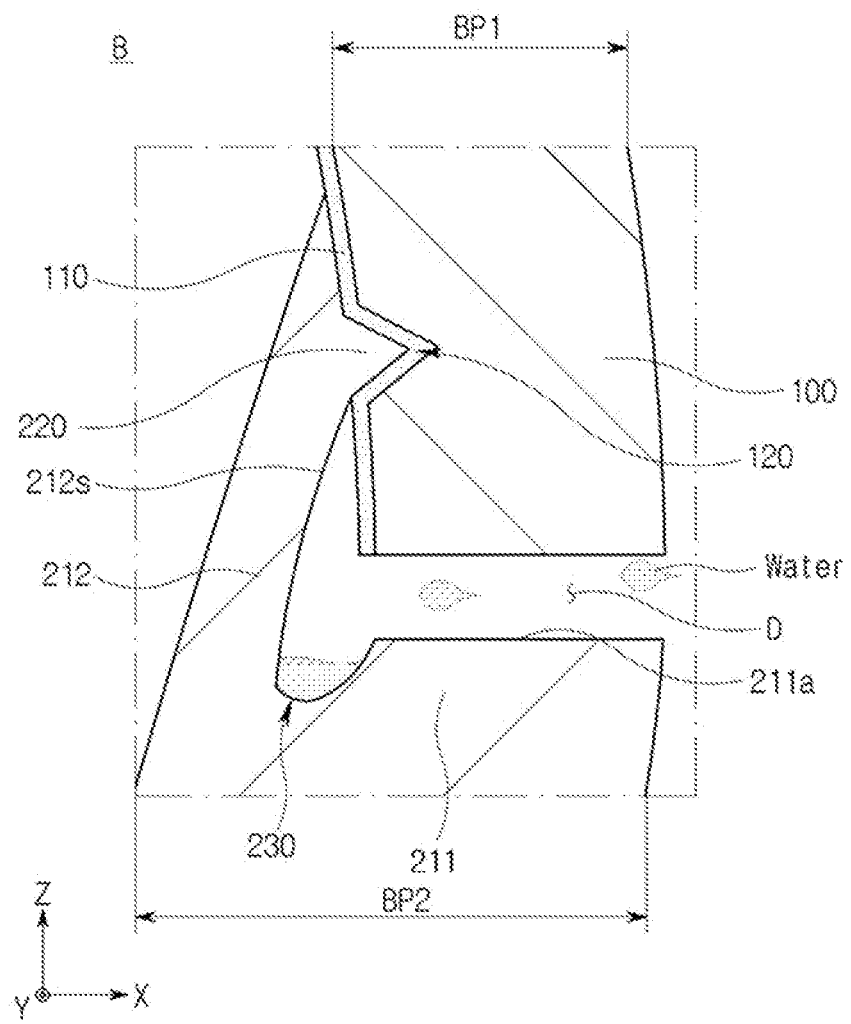
FIGS. 7 and 8 are enlarged views of a region "B" of FIG. 6, which show other embodiments of the present disclosure.

FIG. 7 is an enlarged view of a region "B" of FIG. 6, which illustrates further another embodiment of the present disclosure. FIG. 7 is a cross-sectional view showing an embodiment of the coupling area between the cover member 100 and the housing 200.

Referring to FIG. 7, this figure shows a state in which the display device 10 is mounted on a vehicle or a device, or the display device 10 is erected and fixed. FIG. 7 shows a state in which the display device 10 is rotated by 80 to 110 degrees compared to FIG. 4.

When the display device 10 is erected and fixed, the coupling area between the cover member 100 and the housing 200 faces upward. Therefore, this causes a structure in which water or foreign substances can easily flow into the display device 10.

When the cover member 100 and the housing 200 are coupled, the coupling area between the cover member 100 and the housing can be an area where the cover member 100 and the housing 200 come into contact with each other or are positioned adjacently while forming a gap.

In order to prevent water or foreign substances from flowing into the display device 10 through the coupling area between the cover member 100 and the housing 200, the second groove 230 can be formed or disposed at an edge region of the level difference of the housing 200. The edge region of the level difference can include both a region where the edge of the level difference is located and surrounding regions therearound.

Alternatively, the housing 200 can include the first part 211 and the second part 212 which extends from the first surface 211a of the first part 211. The second groove 230 can be additionally formed or disposed in the first part 211. The second groove 230 can also be formed in the second part 212.

The second groove 230 can be formed in the form of a groove by removing a certain area of the housing 200 by means of a groove forming device such as a laser beam, a grinder, a water jet, and a drilling machine, or can be formed together during an injection molding process for forming the housing 200.

Since the second groove 230 is positioned in a lower portion in the coupling area between the cover member 100 and the housing 200, moisture or foreign substances flowing into the coupling area between the cover member 100 and the housing 200 can flow into the second groove 230, and moisture or foreign substances can be stored in the second groove 230. The second groove 230 can have a concave shape to allow the moisture or foreign substances to be easily collected, and the shape of the second groove 230 is not limited to a specific shape.

The moisture stored in the second groove 230 can be evaporated and removed with the lapse of a certain time, and the foreign substances can be removed together with the moisture.

In order to quickly evaporate the moisture stored in the second groove 230, a certain size of a gap is formed between an end of the cover member 100 and an end of the housing 200, for example, the coupling area between the cover member 100 and the housing 200. Through the gap between the cover member 100 and the housing 200, foreign substances, etc., stored in the second groove 230 can be easily removed by using a device such as a vacuum suction machine.

Figure 8:
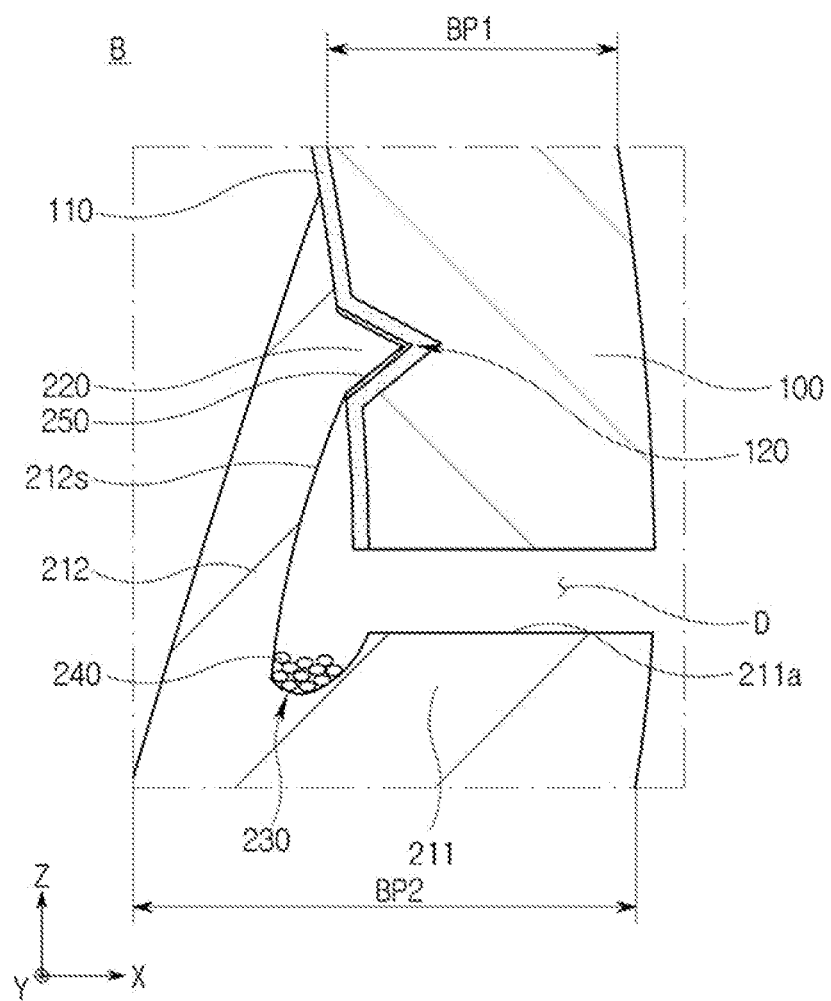

FIG. 8 is an enlarged view of a region "B" of FIG. 6, which illustrates yet further another embodiment of the present disclosure.

Referring to FIG. 8, an absorbent 240 can be disposed in the second groove 230 formed in the housing 200, and a sealing member 250 can be disposed in the first groove 120 of the cover member 100 or on the protrusion 220 of the housing 200.

The absorbent 240 can be a material that absorbs moisture or oxygen that flows into the second groove 230 or forms a compound with the moisture. For example, the absorbent 240 can be at least one of activated carbon, barium, magnesium, zirconium, and red phosphorus. Alternatively, the absorbent 240 can be at least any one of $P_2O_5$, $Li_2O$, $Na_2O$, $BaO$, $CaO$, $MgO$, $Li_2SO_4$, $Na_2SO_4$, $CaSO_4$, $MgSO_4$, $CoSO_4$, $Ga_2(SO_4)_3$, $Ti(SO_4)_2$, $NiSO_4$, $CaCl_2$, $MgCl_2$, $SrCl_2$, $YCl_3$, $CuCl_2$, $CsF$, $TaF_5$, $NbF_5$, $LiBr$, $CaBr_2$, $CeBr_3$, $SeBr_4$, $VBr_3$, $MgBr_2$, $BaI_2$, $MgI_2$, $Ba(ClO_4)_2$ and $Mg(ClO_4)_2$. The type of the absorbent 240 is not limited thereto.

In addition, when moisture, oxygen, and foreign substances which have not been removed by the absorbent 240 flow inward through the coupling area between the cover member 100 and the housing 200, an electrode material or a luminous material, etc., of the display panel 300 is oxidized and a pixel shrinkage can occur or dark spots can be generated within the display area.

Therefore, the seal member 250 can be disposed between the first groove 120 of the cover member 100 and the protrusion 220 of the housing 200 such that moisture, oxygen and foreign substances do not flow into the cover member 100 and the housing 200.

The sealing member 250 is disposed in the first groove 120 of the cover member 100 or on the protrusion 220 of the housing 200. The cover member 100 and the housing 200 are coupled, and then the sealing member 250 can be disposed between the first groove 120 of the cover member 100 and the protrusion 220 of the housing 200.

The sealing member 250 can be made of an epoxy-based material having high adhesive function and sealing function, or an olefin-based material.

The sealing member 250 can be disposed along an edge of the planar cover member 100. For example, the sealing member 250 can be formed along the edge of the display device 10 and can be composed of a film that has a closed curved shape and has a shape and size corresponding to the edge of the display device 10.

The sealing member 250 composed of the film that has a closed curved shape is positioned on the protrusion 220 of the housing 200, and the cover member 100 is coupled to the housing 200, so that the sealing member 250 can be disposed between the first groove 120 of cover member 100 and the protrusion 220 of the housing 200.

The sealing member can be disposed in the coupling area between the cover member 100 and the housing 200. For example, the sealing member 250 can be disposed between the end of the cover member 100 and the first surface 211a of the housing 200. When the sealing member is disposed in the coupling area between the cover member 100 and the housing 200, the moisture stored in the second groove 230 is difficult to evaporate, so that it is necessary to remove the moisture by sufficiently disposing the absorbent 240 in the second groove 230.

The display device according to one or more embodiments of the present disclosure can be described as follows.

The display device according to an embodiment the present disclosure can include: a display panel which displays images; a cover member which is disposed on the display panel and includes a first flat portion, a first bent portion bent from the first flat portion, and a first groove formed in the first bent portion; and a housing which is disposed below the display panel and includes a second flat portion and a second bent portion which is bent from the second flat portion and has a protrusion which is coupled to the first groove.

According to some embodiments of the present disclosure, the second bent portion can include a first part which extends from the second flat portion, a second part which extends from a first surface of the first part, and a protrusion which protrudes from an outer surface of the second part toward an inner surface of the cover member.

According to some embodiments of the present disclosure, a sealing member can be disposed between the first groove and the protrusion.

According to some embodiments of the present disclosure, the sealing member can be disposed along an edge of the planar cover member.

According to some embodiments of the present disclosure, the housing can further include a second groove formed in the first part.

According to some embodiments of the present disclosure, an absorbent can be disposed in the second groove.

According to some embodiments of the present disclosure, the first bent portion can come into contact with the first surface of the first part.

According to some embodiments of the present disclosure, a gap can be between the first bent portion and the first surface of the first part.

According to some embodiments of the present disclosure, the display panel can include a display substrate, a thin film transistor array, an optical plate, and a viewing angle control unit.

According to some embodiments of the present disclosure, the display panel can further include a first adhesive layer on the viewing angle control unit, and the display panel can be fixed to the cover member through the first adhesive layer.

According to some embodiments of the present disclosure, the display panel can further include a support member disposed below the display substrate, a heat dissipation plate, and a guide holder.

According to some embodiments of the present disclosure, a through-hole can be formed in the housing, and a connection member can be inserted into the through-hole to fix the display panel.

According to some embodiments of the present disclosure, a plurality of bosses can be included on a rear surface of the guide holder, and the connection member can contact the plurality of bosses, thereby fixing the display panel.

A vehicle according to the embodiment of the present disclosure can include a driver's seat and a passenger seat, and the display device which is disposed in front of the driver's seat or the passenger seat and includes the cover member and the housing.

While the embodiments of the present disclosure have been described in more detail with reference to the accompanying drawings, the present disclosure is not necessarily limited to the embodiment and can be variously changed without departing from the spirit of the present disclosure. Therefore, the embodiments of the present disclosure are not intended for limiting the spirit of the present disclosure but intended for describing the spirit of the present disclosure, and the scope of the spirit of the present disclosure is not limited by the embodiment. Accordingly, the foregoing embodiments are merely exemplary and are not to be construed as limiting the present disclosure. The scope of the present disclosure should be construed by the claims, and all the technical spirits within the scope equivalent thereto should be construed as being included in the right scope of the present disclosure.

| REFERENCE NUMERALS | | | |
|---|---|---|---|
| 10: | Display Device | 100: | Cover Member |
| 110: | Light-Shielding Member | 120: | First Groove |
| 200: | Housing | 211: | First part |
| 212: | Second part | 211a: | First Surface |
| 212s: | Outer Surface | 220: | Protrusion |
| 230: | Second Groove | 240: | Absorbent |
| 250: | Sealing Member | 300: | Display Panel |
| 310: | Display Substrate | 315: | Thin Film Transistor Array |
| 320: | Light Emitting Layer | 325: | Encapsulation Part |
| 330: | Optical Film | 340: | First Adhesive Layer |
| 335: | Viewing Angle Control Unit | 336: | Lower Control Board |

-continued

REFERENCE NUMERALS

| | | | |
|---|---|---|---|
| 337: | Light-Shielding Pattern | 338: | Control Insulating Layer |
| 339: | Upper Control Board | 345: | Second Adhesive Layer |
| 350: | Support Member | 360: | Heat Dissipation Plate |
| 365: | Third Adhesive Layer | 370: | Guide Holder |
| 372: | Boss | 400: | Connection Member |

What is claimed is:

1. A display device comprising:
   a display panel configured to display images;
   a cover member disposed on the display panel and including a first flat portion, a first bent portion bent from the first flat portion, and a first groove formed in the first bent portion; and
   a housing disposed below the display panel and including a second flat portion and a second bent portion bent from the second flat portion,
   wherein the second bent portion of the housing has a protrusion coupled to the first groove of the cover member, and
   wherein the second bent portion of the housing comprises:
   a first part which extends from the second flat portion, the first part covering an end surface of the first bent portion, and
   a second part which extends from a first surface of the first part, the second part covering an inner surface of the first bent portion.

2. The display device of claim 1,
   wherein the protrusion of the second bent portion protrudes from an outer surface of the second part toward an inner surface of the cover member.

3. The display device of claim 1, further comprising:
   a sealing member disposed between the first groove and the protrusion of the second bent portion.

4. The display device of claim 3, wherein the sealing member is disposed along an edge of the cover member.

5. The display device of claim 2, wherein the housing further comprises a second groove formed in the first part of the second bent portion of the housing.

6. A display device comprising:
   a display panel configured to display images;
   a cover member disposed on the display panel and including a first flat portion, a first bent portion bent from the first flat portion, and a first groove formed in the first bent portion; and
   a housing disposed below the display panel and including a second flat portion and a second bent portion bent from the second flat portion,
   wherein the second bent portion of the housing has a protrusion coupled to the first groove of the cover member,
   wherein the second bent portion of the housing comprises:
   a first part which extends from the second flat portion,
   a second part which extends from a first surface of the first part, and
   the protrusion of the second bent portion, which protrudes from an outer surface of the second part toward an inner surface of the cover member,
   wherein the housing further comprises a second groove formed in the first part of the second bent portion of the housing, and
   wherein an absorbent is disposed in the second groove of the housing.

7. The display device of claim 2, wherein the first bent portion of the cover member comes into contact with the first surface of the first part of the second bent portion of the housing.

8. A display device comprising:
   a display panel configured to display images;
   a cover member disposed on the display panel and including a first flat portion, a first bent portion bent from the first flat portion, and a first groove formed in the first bent portion; and
   a housing disposed below the display panel and including a second flat portion and a second bent portion bent from the second flat portion,
   wherein the second bent portion of the housing has a protrusion coupled to the first groove of the cover member,
   wherein the second bent portion of the housing comprises:
   a first part which extends from the second flat portion,
   a second part which extends from a first surface of the first part, and
   the protrusion of the second bent portion, which protrudes from an outer surface of the second part toward an inner surface of the cover member, and
   wherein a gap is disposed between the first bent portion of the cover member and the first surface of the first part of the second bent portion of the housing.

9. The display device of claim 1, wherein the display panel comprises:
   a display substrate,
   a thin film transistor array on the display substrate,
   an optical plate on the thin film transistor array, and
   a viewing angle control unit on the optical plate.

10. The display device of claim 9, wherein the display panel further comprises a first adhesive layer on the viewing angle control unit, and
    wherein the display panel is fixed to the cover member through the first adhesive layer.

11. The display device of claim 9, wherein the display panel further comprises:
    a support member disposed below the display substrate,
    a heat dissipation plate disposed below the support member, and
    a guide holder disposed below the heat dissipation plate.

12. The display device of claim 11, wherein a through-hole is formed in the housing, and
    wherein a connection member is inserted into the through-hole to fix the display panel.

13. The display device of claim 12, wherein a plurality of bosses is included on a rear surface of the guide holder, and
    wherein the connection member contacts the plurality of bosses, thereby fixing the display panel.

14. A vehicle comprising:
    a driver's seat and a passenger seat; and
    the display device according to claim 1, which is disposed in the vehicle for being visible from the driver's seat or the passenger seat.

15. The display device of claim 1, wherein the first groove partially recesses the first bent portion.

* * * * *